(12) United States Patent
Wu (10) Patent No.: US 7,116,552 B2
(45) Date of Patent: Oct. 3, 2006

(54) HEAT-DISSIPATION APPARATUS OF PORTABLE COMPUTER

(75) Inventor: Chung Wu, Taipei (TW)

(73) Assignee: Chaun-Choung Technology Corp., Taipei (TW)

( * ) Notice: Subject to any disclaimer, the term of this patent is extended or adjusted under 35 U.S.C. 154(b) by 32 days.

(21) Appl. No.: 11/045,266

(22) Filed: Jan. 31, 2005

(65) Prior Publication Data

US 2006/0171113 A1 Aug. 3, 2006

(51) Int. Cl.
*G06F 1/20* (2006.01)
*H05K 7/20* (2006.01)

(52) U.S. Cl. .................. 361/687; 361/705; 165/80.3; 174/15.2

(58) Field of Classification Search ........ 361/679–687, 361/724–727, 699–700, 704, 707; 165/86, 165/80.3–80.4; 174/15.2; 62/259.2
See application file for complete search history.

(56) References Cited

U.S. PATENT DOCUMENTS

| | | | |
|---|---|---|---|
| 6,097,596 A * | 8/2000 | Cipolla et al. | 361/687 |
| 6,595,269 B1 * | 7/2003 | Mitchell | 165/86 |
| 2002/0064027 A1 * | 5/2002 | Sasaki et al. | 361/700 |

* cited by examiner

*Primary Examiner*—Hung Van Duong (57) ABSTRACT

A heat-dissipation apparatus of the portable computer is fabricated in a host and a display unit pivotal connected therein for dissipating the heat from the electronic component. The apparatus has a conductive part whose thickness is designed to be equal to the thickness of the portable computer when closed. The conductive part has a first connecting portion and a second connecting portion, which the second connecting portion is used to be inserted by a cooling end of a first heat pipe. The heating end of the first heat pipe extends into the host and faces to the electronic component. The first connecting portion is used to be inserted by a heating end of a second heat pipe. The cooling end of the second heat pipe extends to the display unit.

17 Claims, 7 Drawing Sheets

HEAT-DISSIPATION APPARATUS OF PORTABLE COMPUTER

BACKGROUND OF THE INVENTION

The present invention relates in general to a heat-dissipation apparatus of a portable computer, and more particular, to an apparatus which has a conductive part with the different axes for fabricating a first heat pipe extending onto the electronic component, and a second heat pipe extending to a display unit. The conductive part is not a hinge, so it has nothing to do with the supporting force of the portable computer. The thickness of the conductive part can be adjusted to fit the thickness of the portable computer for keeping the heat pipe being relative to the electronic component smoothly.

Nowadays, the portable computer needs to be reduced its weight and size for carrying out. The space of host of the portable computer therefore is reduced comparatively, specially the space for fabricating heat-dissipation apparatus. Due to the processing speed of the computer is much faster than before, the heat-dissipation issue is become much more important, too. How to compromise between larger space and better heat conductibility will be an important issue for manufacturer.

Conventional heat pipe has an excellent heat conductibility so as to be used in the heat-dissipation module usually. One example is referring to an U.S. Pat. No. 6,122,166 disclosed a personal computer cooling device having hinged heat pipe. The cooling device is composed by a first heat pipe and a second heat pipe, which forms a hinge at the same time by their combination for connecting the host and the display unit of the portable computer. One end of the first heat pipe is a hollow pipe which provides for the second heat pipe pivoted therein, and another end of the first heat pipe extends around the display unit. The end of the second heat pipe opposite to the end pivoted in the first heat pipe extends to a heat source of the host of the portable computer. Therefore, the first heat pipe will conduct the heat from the heat source to the second heat pipe, and second heat pipe dissipate the heat. That will save the space of the portable computer and leave another hinge structure out. But the above-mentioned hinge combined by the heat pipes can not provide a proper supporting force to handle the opening motion of the portable computer, and the combination of the heat pipes is not easier to fit different types of variable portable computers. If the heat pipes are unsuited to the specific portable computer by means of the wrong enforcement, the incorrect bending angle, or a difference between the heat pipes and the portable computer, they will raise during the portable computer opened. The efficiency of conduction will drop therefor.

BRIEF SUMMARY OF THE INVENTION

The present invention provides a new design for relocation the heat-dissipation apparatus of the portable computer, wherein comprises a conductive part having a first heat pipe extending to a electronic component and a second heat pipe extending to a display unit which has a different height from the first heat pipe. Due to the heat pipes do not provide the supporting force like a hinge of the portable computer, they are easier to be adjusted for fitting the portable computer. Furthermore, they will be kept flat on the electronic component, but raised.

The objectives of the present invention will become obvious to those of ordinary skill in the art after reading the following detailed description of preferred embodiments.

It is to be understood that both the foregoing general description and the following detailed description are exemplary, and are intended to provide further explanation of the invention as claimed.

BRIEF DESCRIPTION OF THE DRAWINGS

These as well as other features of the present invention will become more apparent upon reference to the drawings therein.

DETAILED DESCRIPTION OF THE INVENTION

Reference will now be made in detail to the preferred embodiments of the present invention, examples of which are illustrated in the accompanying drawings. Wherever possible, the same reference numbers are used in the drawings and the description to refer to the same or like parts.

Figure 1:
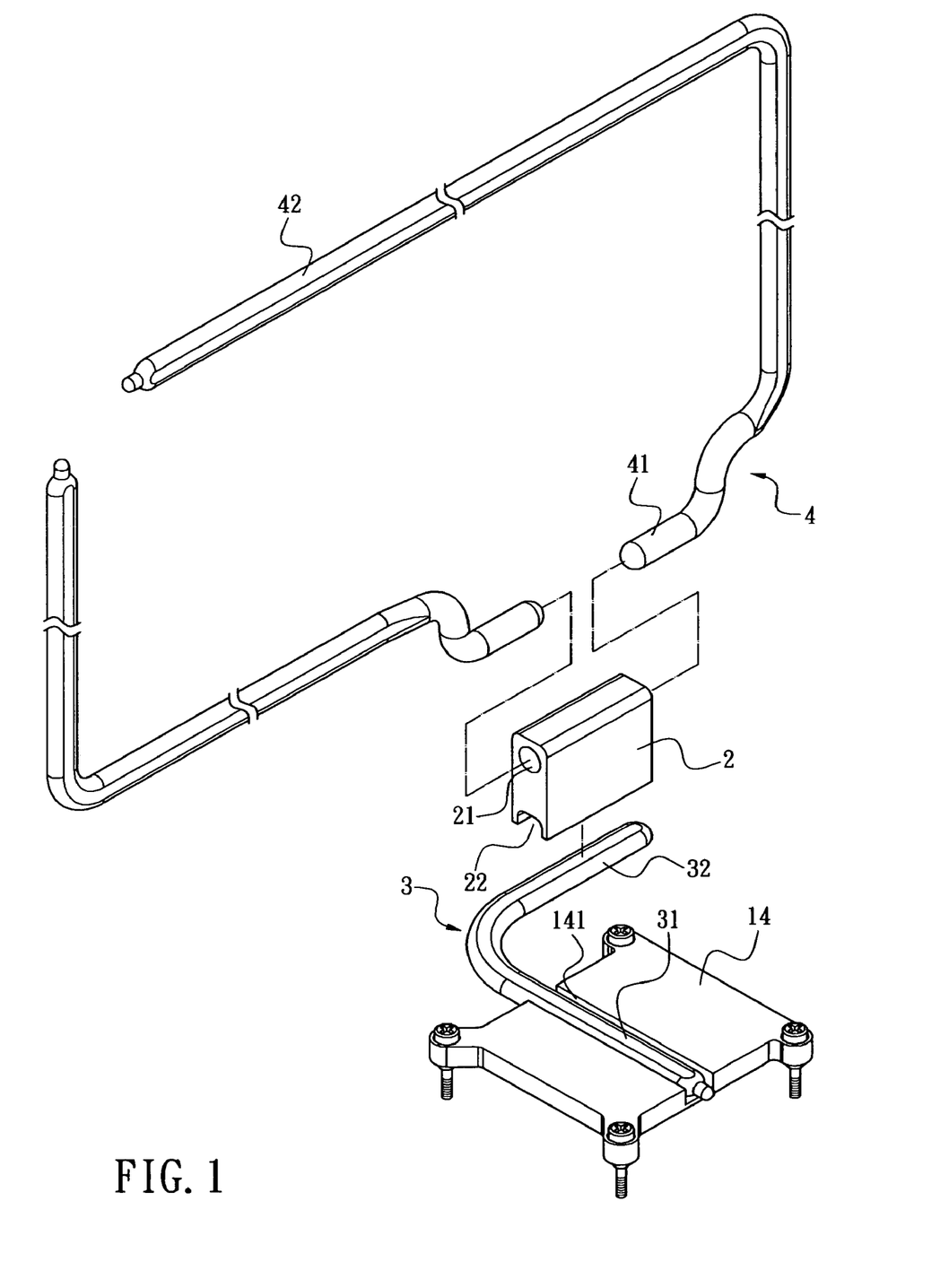
FIG. 1 is a structural exploding schematic view of the heat-dissipation device as disclosed in the embodiment of this invention.
Figure 2:
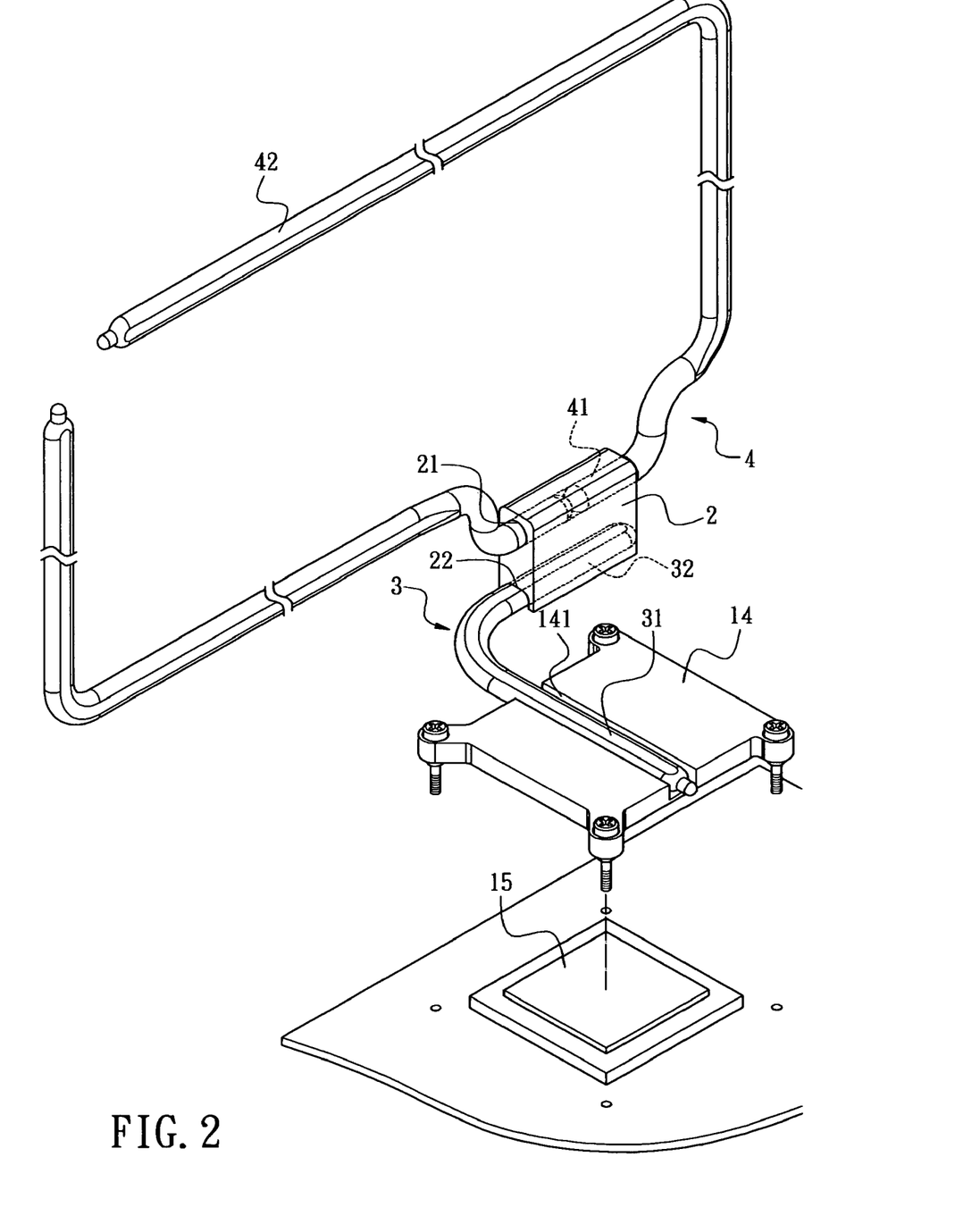
FIG. 2 is a structural combining schematic view of the heat-dissipation device as disclosed in the embodiment of this invention.
Figure 3:
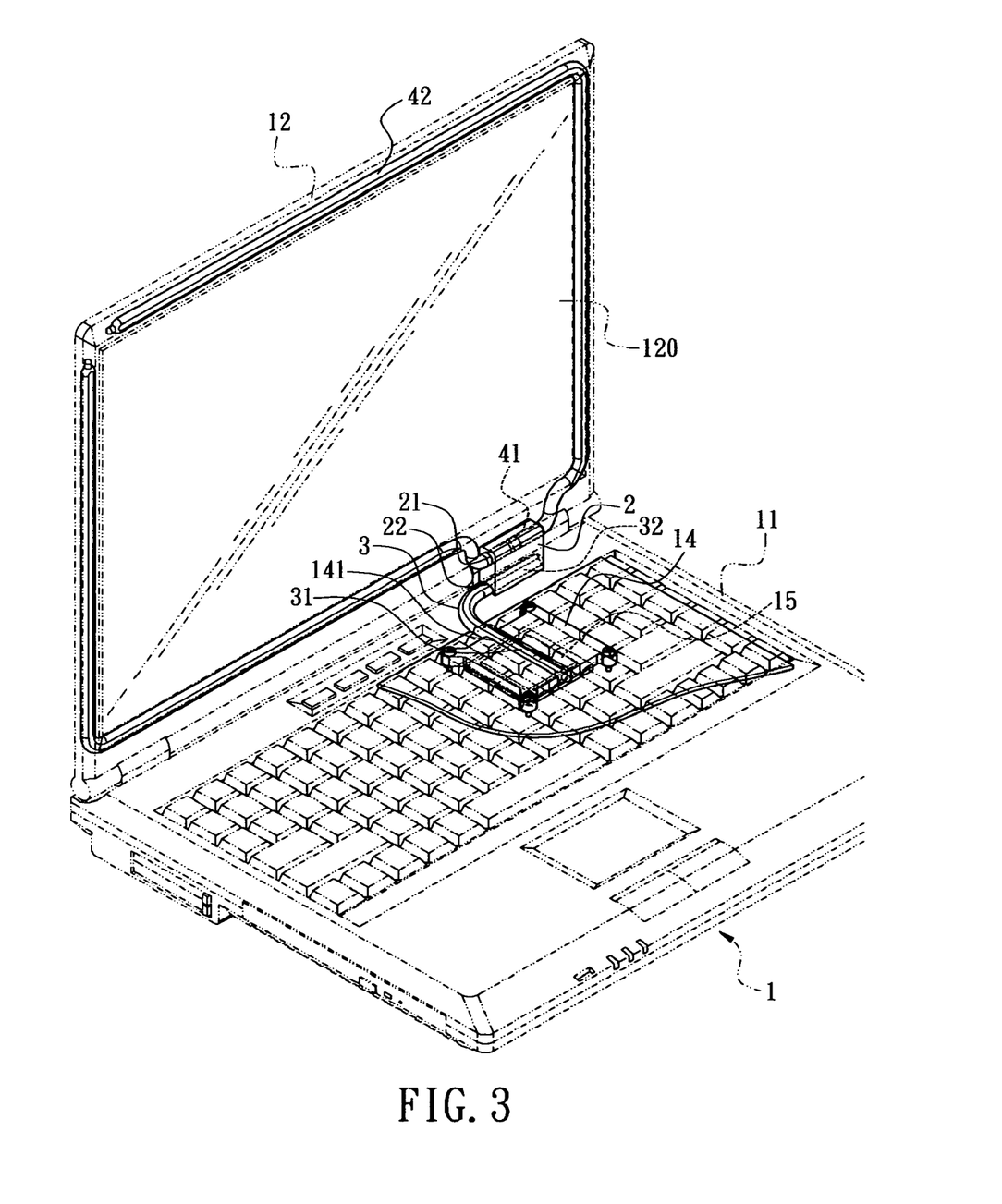
FIG. 3 is a three dimensional schematic view of the heat-dissipation device applied in a portable computer as disclosed in the embodiment of this invention.

Please refer to FIGS. 1, 2, and 3. The heat-dissipation apparatus of portable computer of this invention comprises a portable computer 1, a conductive part 2 adjacent to a hinge of the portable computer 1, a first heat pipe 3, and a second heat pipe 4 at a different position from the first heat pipe 3.

The portable computer 1 comprises a host 11 and a display unit 12, which are pivotally combined together by a hinge 13. Therefore, the host 11 and the display unit 12 can be operated, such as be opened or be closed relatively, according to the hinge 13.

The conductive part 2 is made of a material with high heat conductibility. It is composed adjacent to the hinge 13 between the host 11 and the display unit 12. The conductive part 2 comprises a first connecting portion 21 and a second connecting portion 22 thereon. They are suitable for the first heat pipe 3 and the second heat pipe 4 individually inserted therein by different axes.

The first connecting portion 21 is a through hole of the conductive part 2 for the second heat pipe 4 fabricating therein relatively. The second connecting portion 22 is an indent beneath the conductive part 2 for the first heat pipe 3 fabricating thereon. Therefore, the first heat pipe 3 and the second heat pipe 4 are positioned at different axes individually. There is an interval between them. The conductive part 2 is conductive and rotatable according to operation of the display unit 12 related to the host 11.

Figure 6:
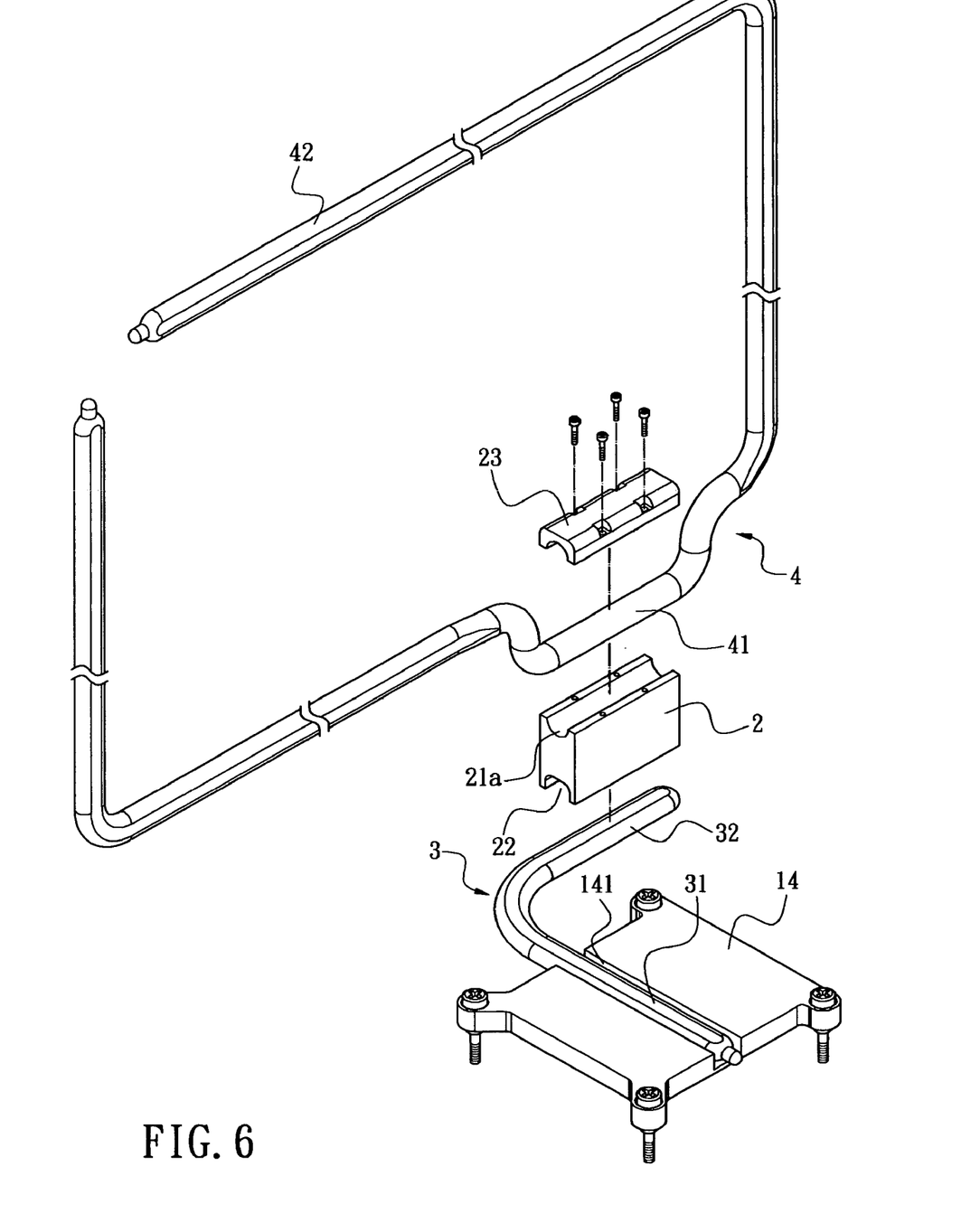
FIG. 6 is a structural exploding schematic view of the heat-dissipation device as disclosed in another embodiment of this invention.
Figure 7:
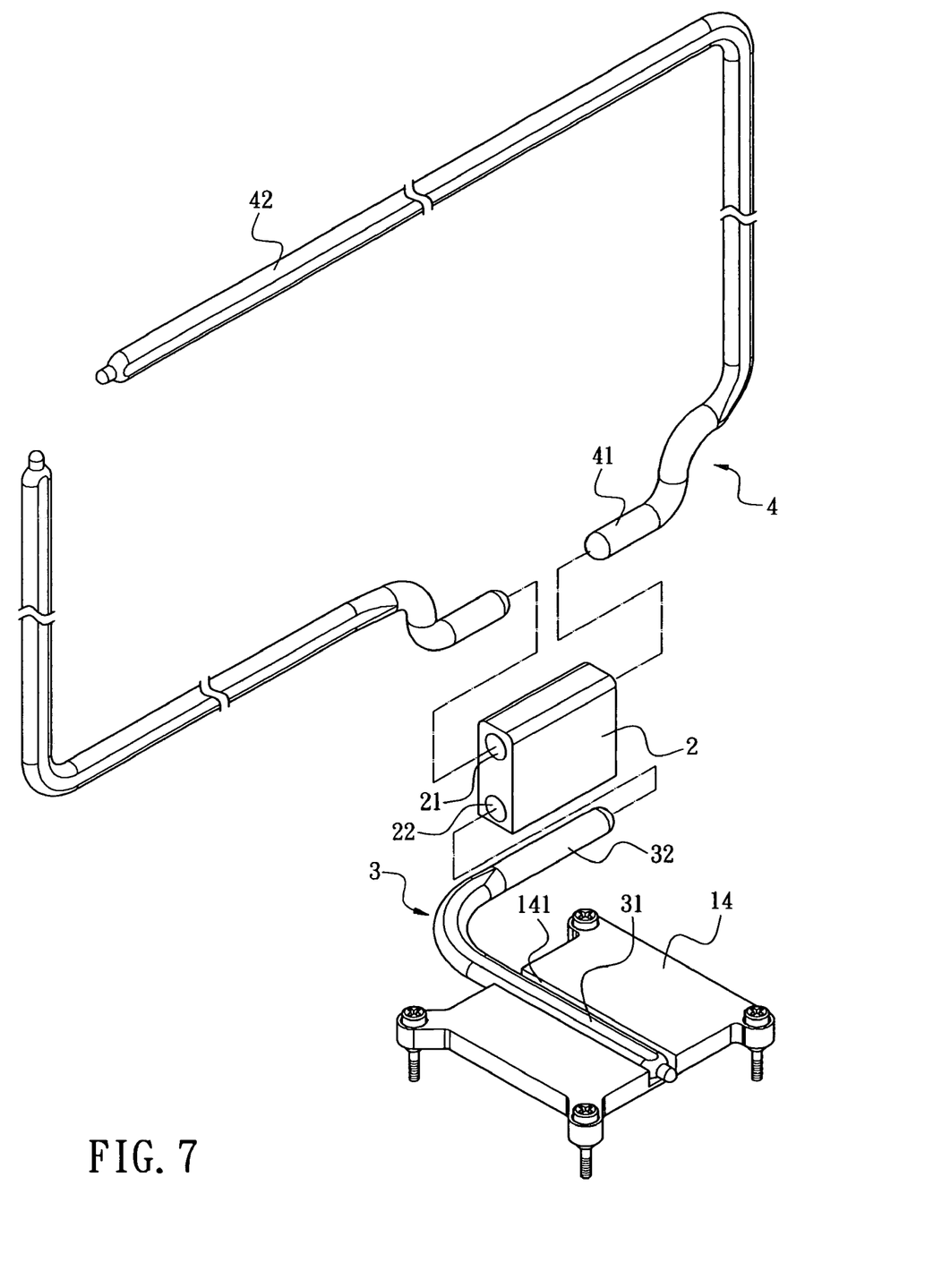
FIG. 7 is a structural exploding schematic view of the heat-dissipation device as disclosed in the other embodiment of this invention.

Please refer to FIG. 6, it shows another embodiment of the first connecting portion 21. It is fabricated on the conductive part 2 by the same method of the second connecting portion 22, to from a first connecting portion 21a. There is a cover 23 on the first connecting portion 21a. Therefore, the second heat pipe 4 will be inserted in to the first connecting portion 21a and rotate according the operation of the display unit 12.

The first heat pipe 3 has a cooling end connecting to the second connecting portion 22 at the bottom of the conductive part 2, and a heating end extending into a recess 141 of the heat sink 14, wherein the heat sink 14 has a broader surface facing to the electronic component 15 for improving heat transferring.

The second heat pipe 4 has a heating end connecting to the first connecting portion 21 of the conductive part 2, and a cooling end extending to an area around a display zone 120 of the display unit 12.

The heat sink 14 is used to absorb the heat from the electronic component 15, and transfer to the heating end 31 of the first heat pipe 3. The first heat pipe 3 conducts the heat to the conductive part 2 via the cooling end 32 and dissipates the heat. Than the heating end 41 of the second heat pipe 4 absorbs the heat from the conductive part 2. The second heat pipe 4 will conducts the heat to the area around the display zone 120 of the display unit 12 via the cooling end 42 and dissipates the heat.

Figure 5:
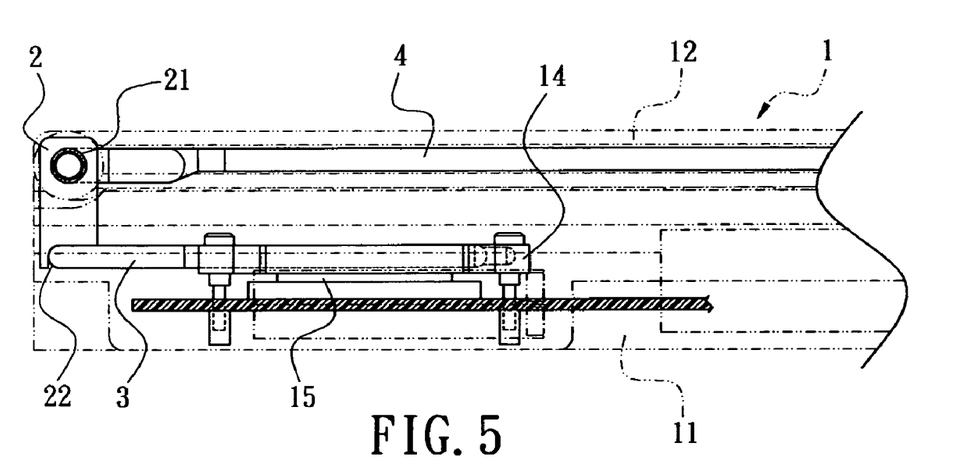
FIG. 5 is a lateral schematic view of the heat-dissipation device applied in a portable computer closed as disclosed in the embodiment of this invention.

The interval between the first heat pipe 3 and the second heat pipe 4 of the conductive part 2 is shown in FIG. 5. It is just equal to the thickness between the electronic component 15 of the host 11 and the display unit 12 of the portable computer 1 when closed. That is, the thickness of the conductive part 2 is equal to the thickness of the portable computer 1 when closed. According to this reason, the thickness of the conductive part 2 is designed to be equal to the thickness of the portable computer 1 when closed. The heating end of the first heat pipe 3 won't be tear off from the heat sink 14, if the first heat pipe 3 and the second heat pipe 4 of the conductive part 2 are not suitable to the operation of the portable computer 1. The flatness between the heat sink 14 and the electronic component 15 become poorer, furthermore, the conductive efficiency of the heat-dissipation apparatus will drop therefor.

Figure 4:
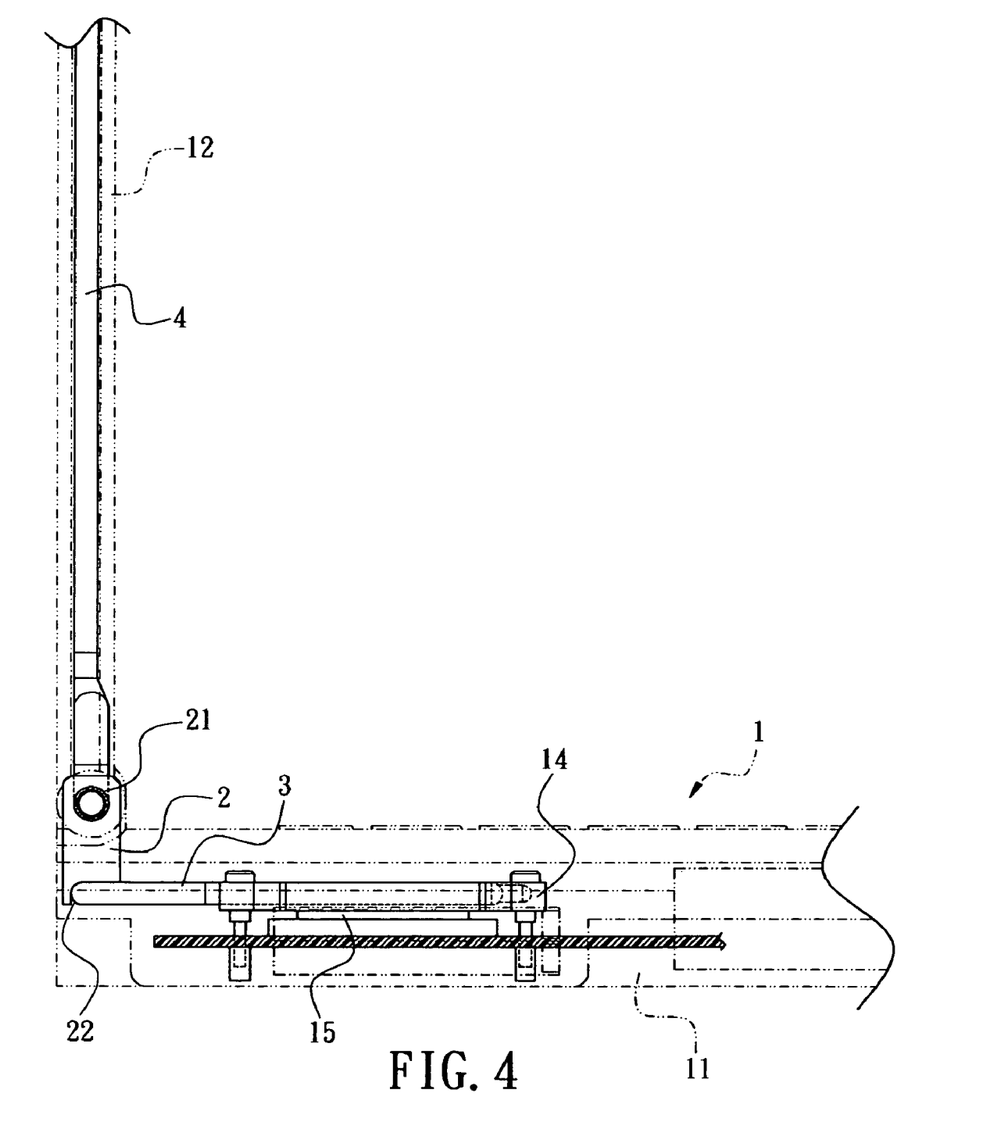
FIG. 4 is a lateral schematic view of the heat-dissipation device applied in a portable computer opened as disclosed in the embodiment of this invention.

Please refer to FIG. 3. According to the above-mentioned heat-dissipation apparatus having the first heat pipe 3, and the second heat pipe 4 of the conductive part 2 is fabricated in the portable computer 1. The first heat pipe 3 of the conductive part 2 is fabricated in the host 11, and the second heat pipe 4 is fabricated adjacent to the display unit 12, and the conductive part 2 between the first heat pipe 3 and the second heat pipe 4 is a media for transferring the heat. Hence, the conductive part 2 has no any supporting function like a hinge. Because of the second heat pipe 4 freely inserting into the first connecting portion 21, the second heat pipe 4 will rotate according to the axis of the first connecting portion 21 when the display unit 12 operating, such like opening operation referring to FIG. 4 or closing operation referring to FIG. 5. The supporting force between the host 11 and the display unit 12 won't be influenced. The advantage of the above-mentioned heat-dissipation apparatus includes keeping the flatness between the electronic component and the heat pipe and not affecting the supporting force by the hinge according to the design of the thickness of the conductive part is equal to the thickness of the portable computer smoothly.

Furthermore, the second connecting portion 22 of the conductive part 2 is a through hole thereon. The cooling end 32 of the first heat pipe 3 is relatively a cylinder pipe for inserting into the second connecting portion 22. The heating end 31 of the first heat pipe 3 is a flat pipe for fabricating in the recess 141 of the heat sink 14 easily.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A heat-dissipation apparatus of portable computer fabricated in a host and a display unit pivotal connected together for cooling down an electronic component in the host, comprising:
   a conductive part fabricated between the host and the display unit and having a first connecting portion and a second connecting portion;
   a first heat pipe having a cooling end connecting to the second connecting portion and a heating end extending into the host; and
   a second heat pipe having a heating end connecting to the first connecting portion and a cooling end extending to the display unit,
   wherein the thickness of the conductive part is equal to the thickness of the portable computer when closed.

2. The heat-dissipation apparatus of portable computer of claim 1, wherein the first connecting portion and the second connecting portion are positioned at different axes of the conductive part apart.

3. The heat-dissipation apparatus of portable computer of claim 1, wherein the first connecting portion and the second connecting portion are separated by an interval of the conductive part apart.

4. The heat-dissipation apparatus of portable computer of claim 1, wherein the first connecting portion and the second connecting portion are through holes of the conductive part.

5. The heat-dissipation apparatus of portable computer of claim 1, wherein the first connecting portion and the second connecting portion are indents on the conductive part.

6. The heat-dissipation apparatus of portable computer of claim 1, wherein the first connecting portion has a cover whereon.

7. The heat-dissipation apparatus of portable computer of claim 1, wherein the first connecting portion is a through hole and the second connecting portion is an indent on the conductive part.

8. The heat-dissipation apparatus of portable computer of claim 1, wherein the heating end of the first heat pipe extends into the host and connects to a heat sink, which faces to a surface of the electronic component.

9. The heat-dissipation apparatus of portable computer of claim 3, wherein the interval of the first heat pipe and the second heat pipe fabricated in the conductive part is equal to the thickness between the electronic component of the host and the display unit when portable computer closed.

10. A heat-dissipation apparatus of portable computer fabricated in a host and a display unit pivotal connected together for cooling down an electronic component in the host, comprising:
   a conductive part fabricated between the host and the display unit and having a first connecting portion and a second connecting portion;

a first heat pipe having a cooling end connecting to the second connecting portion and a heating end extending into the host; and a second heat pipe having a heating end connecting to the first connecting portion and a cooling end extending to the display unit, wherein the first connecting portion and the second connecting portion are separated by an interval of the conductive part apart, and wherein the interval of the first heat pipe and the second heat pipe fabricated in the conductive part is equal to the thickness between the electronic component of the host and the display unit when portable computer closed.

11. The heat-dissipation apparatus of portable computer of claim 10, wherein the first connecting portion and the second connecting portion are positioned at different axes of the conductive part apart.

12. The heat-dissipation apparatus of portable computer of claim 10, wherein the first connecting portion and the second connecting portion are through holes of the conductive part.

13. The heat-dissipation apparatus of portable computer of claim 10, wherein the first connecting portion and the second connecting portion are indents on the conductive part.

14. The heat-dissipation apparatus of portable computer of claim 10, wherein the first connecting portion has a cover whereon.

15. The heat-dissipation apparatus of portable computer of claim 10, wherein the first connecting portion is a through hole and the second connecting portion is an indent on the conductive part.

16. The heat-dissipation apparatus of portable computer of claim 10, wherein the heating end of the first heat pipe extends into the host and connects to a heat sink, which faces to a surface of the electronic component.

17. The heat-dissipation apparatus of portable computer of claim 10, wherein the thickness of the conductive part is equal to the thickness of the portable computer when closed.

* * * * *